Feb. 24, 1931.　　　　　O. OLSON　　　　1,793,746
AGRICULTURAL MACHINE
Filed Oct. 18, 1929　　　3 Sheets-Sheet 1

Inventor
Olof Olson

By Clarence A. O'Brien
Attorney

Feb. 24, 1931.　　　O. OLSON　　　1,793,746
AGRICULTURAL MACHINE
Filed Oct. 18, 1929　　　3 Sheets-Sheet 2

Inventor
*Olof Olson*

By *Clarence A. O'Brien*
Attorney

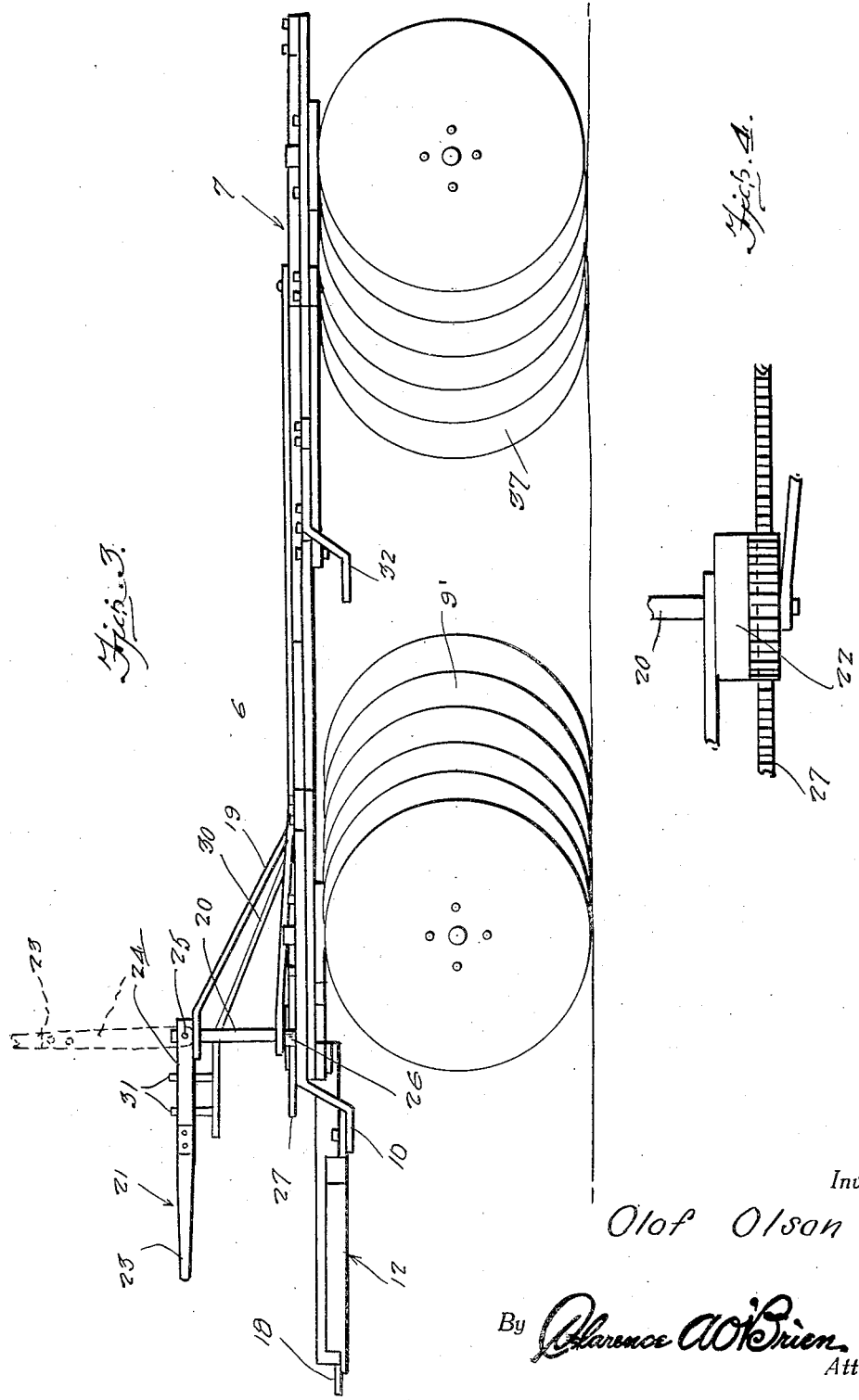

Patented Feb. 24, 1931

1,793,746

UNITED STATES PATENT OFFICE

OLOF OLSON, OF KINGSBURG, CALIFORNIA

AGRICULTURAL MACHINE

Application filed October 18, 1929. Serial No. 400,670.

This invention relates to an improved agricultural apparatus or machine which is expressly constructed for severing and turning under the ground tree and vine prunings, cover crops, trash, and the like.

More specifically stated, I have evolved and produced a novel portable machine which is characterized by a pair of complemental unitary disc assemblies having appropriate draft means, and means for adjustably connecting these assemblies or units together in order that they may be disposed in variable angular relationships with respect to each other to accomplish the severing and turning under action desirable in a machine of this form.

Briefly stated, I have found it to be practicable in the development of an apparatus of this kind to provide a pair of especially designed supporting frames with means for pivotally and adjustably connecting these frames together, each frame constituting a carrier or mounting for a gang of rotatably mounted concavo-convex ground engaging discs.

The particular structural elements and their specific association and cooperation will become more readily apparent from the following description and drawings.

In the drawings:

Figure 3 is a side elevational view of the structure seen in Figure 1 observing it in a direction from left to right.

Figure 4 is an enlarged detail view of the adjusting pinion and rack bar arrangement.

Figure 1:
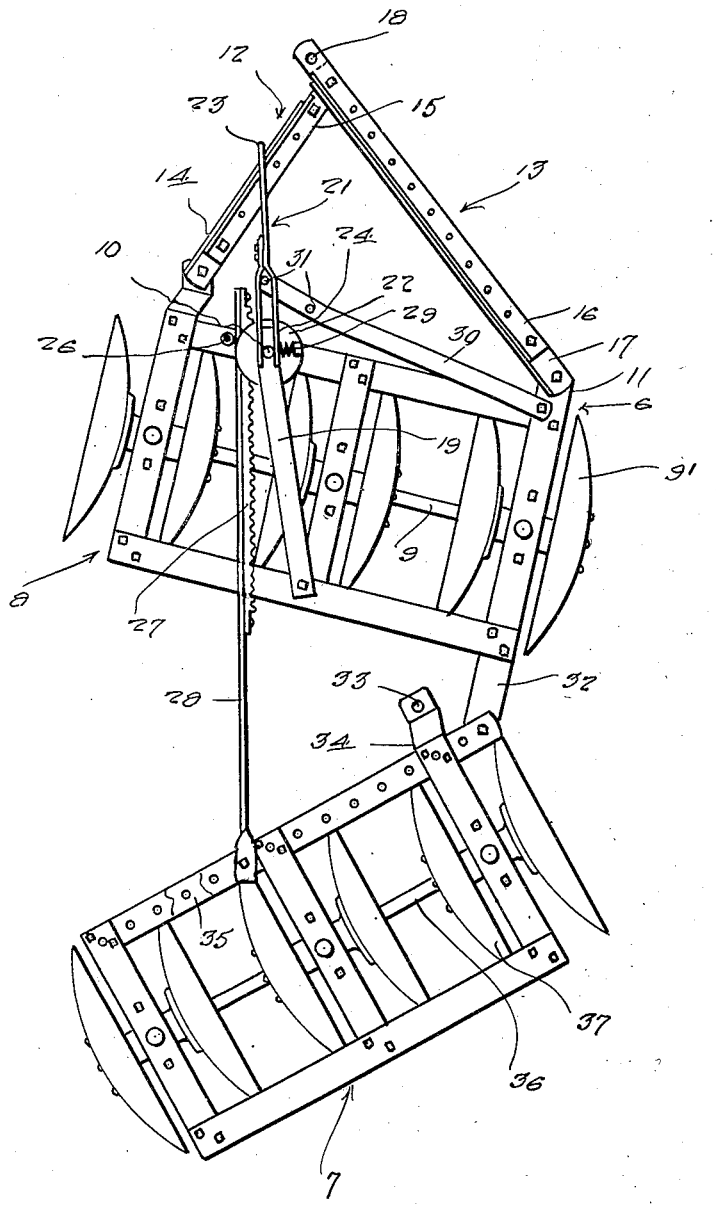
Figure 1 is a top plan view of the complete machine showing the disc units or assembly in longitudinal relationship.

The general construction may well be seen in Figure 1 wherein it will be observed that one disc gang assembly or unit is denoted by the reference character 6 and the companion unit by the reference character 7.

The unit 6 is provided with substantially rectangular supporting frame structures 8 from which a rotary axle 9 is suspended. This is arranged in appropriate suspension bearings and carries a plurality of longitudinally spaced ground engaging discs 9'. These are of concavo-convex relationship with their concaved sides disposed toward the left.

The end bars of the frame are provided with forward extensions 10 and 11, the first named of which is offset laterally and downward to accommodate the draft bars 12 and 13 respectively. These draft bars are composed of complemental angle irons. For instance the angle irons of the part 12 are designated by the reference characters 14 and 15 and disposed in overlapping adjustable relationship. These are somewhat shorter than the companion bars 16 and 17 of the complemental parts 13.

It will be observed that the angle iron 16 has its forward end extended in apertures as indicated at 18 to permit the draft appliance (not shown) to be connected thereto and to permit the line of draft to be regulated to vary the line of travel of the discs 9. In other words, these discs may be caused to travel diagonally of the row, in direct longitudinal alinement with the row, or at varying angular relationships.

The reference character 19 designates the brace which is directed upwardly as seen in Figure 3 and connected to the upper end portion of a post 20. Carried by this post is an operating lever 21 for a pinion or gear 22 which is fixedly mounted on the low end portion of the shaft and adjacent the frame. This lever includes a handle 23 and a fork 24 whose arms straddle the upper end portion of the post and are pivotally connected thereto as at 25.

The adjacent end portion of the brace 19 is somewhat resilient and constitutes a retainer for the pivoted end of the lever. The lever is adjustable from a horizontal position to any point between said horizontal position and the vertical dotted line position represented in Figure 3. This permits the lever to be conveniently grasped by the operator and to be manipulated for turning the shaft 20 and the gear 22 thereon.

Disposed on the framework alongside of the gear is a guide roller 26 as seen in Figure 1 and a rack bar is associated with this, the rack bar being designated at 27 and being mounted on an arm 28 which bears slidably against the roller and thereby holds the rack teeth in engagement with the gear teeth. The reference character 29 designates a spring which cooperates with the pivoted end of the lever for aiding it in holding it in various adjusted positions.

I also call attention to a retaining bar 30 having a plurality of keeper pins 31 thereon over which the forked end portion of the lever may be engaged to hold the lever against undue movement.

I next call attention to the fact that the right hand end bar of the frame 8 is provided with a rear extension 32 by means of which the frame 6 is connected with the companion frame 7. The latter frame 7 has its corresponding end bar formed with a laterally offset apertured attaching ear 33. The front bar of the frame is actually made up of two sections 34 and 35 disposed in overlapping relationship and adjustably connected together by a bolt.

Figure 2:
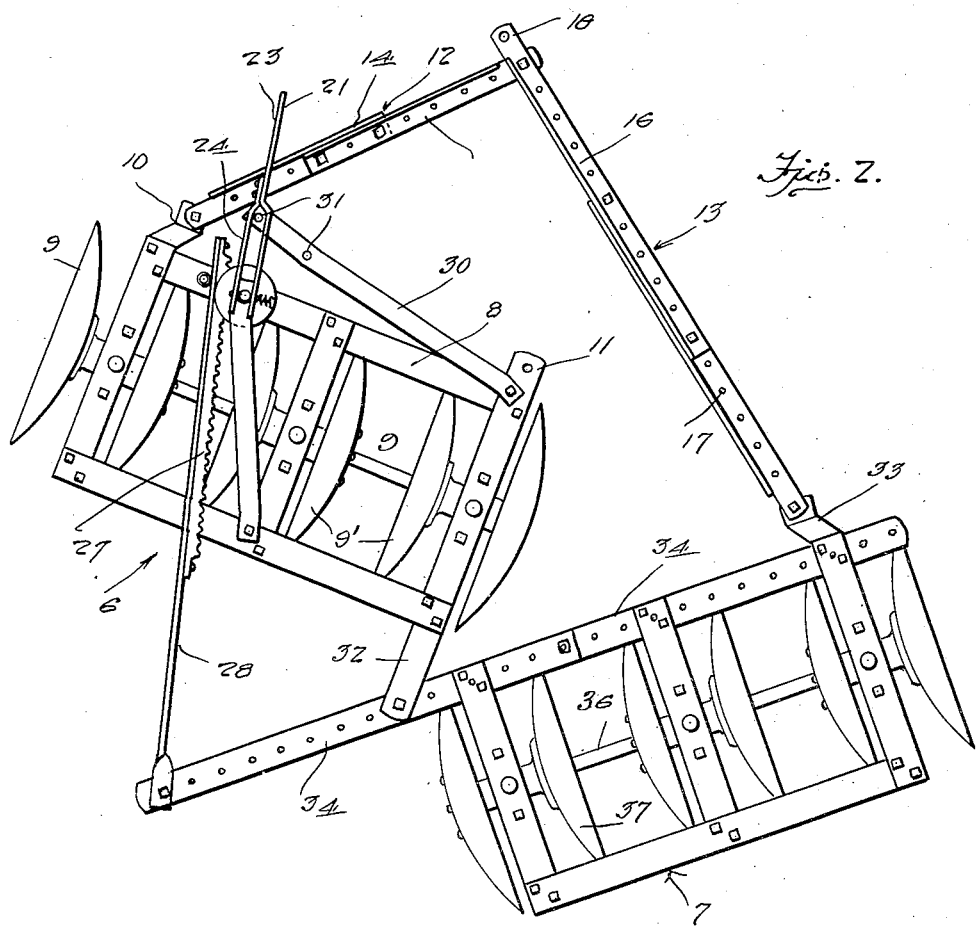
Figure 2 is a similar view showing the units adjusted into somewhat abreast angular relationship with the inner ends disposed in close spaced proximity to each other.
Figure 5:
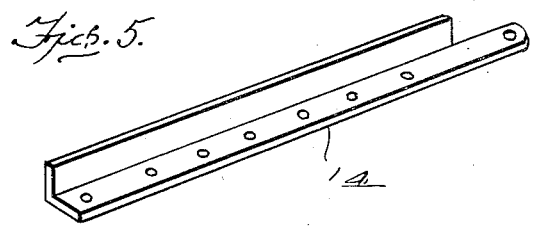
Figure 5 is a perspective view of one of the details.

The adjacent end of the aforesaid arm 28 is adjustably connected with the sections 34 and 35 to join the respective devices or units 6 and 7 together, and to permit the angularity thereof to be varied from the position shown in Figure 1 to the position shown in Figure 2.

The reference character 36 designates the shaft on which the complemental discs 37 are mounted. These discs 37 are also concavo-convex in configuration and have their concaved sides opening in the direction opposite to the corresponding sides of the first named discs 9.

It will thus be seen that through the medium of the extensible draft means 12 and 13, and the extensible bar sections 34 and 35, the two separate disc gang devices 6 and 7 may be adjustably connected together for cooperation with each other at varying angles. Then too, the adjustment may be readily affected and varied from time to time through the medium of the lever actuated pinion and rack structure.

In Figure 1 the arrangement constitutes double discs, a structure which is especially useful for turning under tree and vine prunings, whereas in Figure 2 the arrangement is converted into a wide single disc arrangement leaving no untouched strip through the center because of the cooperation of the innermost discs 9 and 37 respectively.

The only change that is necessary in the Figure 2 arrangement is to extend the complemental bar sections 34 and 35 and to also extend the angle bar members of the devices 12 and 13 in the draft appliance.

It is thought that by considering the description in connection with the drawings, a clear understanding of the construction, operation and features and advantages of the invention will be had. Therefore, a more lengthy description is regarded unnecessary.

Minor changes in shape, size and rearrangement of details coming within the field of invention claimed may be resorted to in actual practice if desired.

I claim:

1. In an agricultural machine of the class described, a horizontal supporting frame, an axle suspended beneath said frame, a gang of concavo-convex discs mounted on said axle for rotation therewith, a second frame provided with an axle and a plurality of individual concavo-convex discs mounted thereon faced in opposition to the first named discs, means for pivotally and adjustably connecting said frames together, manually adjusted means for regulating and varying the angularity of the frames to permit the frames to assume a wide angular end to end relationship with each other of nearly approaching coincidental axes in which only one disc follows the track of a preceding disc of the leading and following frames, and extensible angle irons adjustably connected together to form an adjustable draft appliance adapted to be connected selectively with the said frames.

2. In an agricultural apparatus of the class described, a horizontal frame of general rectangular form, an axle suspended centrally beneath said frame and mounted for rotation in bearings carried by the frame, a plurality of longitudinally spaced concavo-convex ground engaging discs mounted for rotation on said axle, a vertical shaft rising from and mounted for rotation on said frame, a pinion carried by said shaft, an operating lever for said shaft, a rack bar slidably mounted on said frame and having its teeth engageable with the teeth of said pinion, a second rectangular frame, an axle on said second frame, a series of separate discs carried by said second named axle, means for adjustably and pivotally connecting said frames together, said rack bar being adjustably connected with said second named frame to permit the two frames to be varied in angularity with respect to each other, and an adjustable and variable draft appliance embodying extensible members selectively connected with said frames.

In testimony whereof I affix my signature.

OLOF OLSON.